(12) United States Patent
Billhartz et al.

(10) Patent No.: US 6,931,132 B2
(45) Date of Patent: Aug. 16, 2005

(54) SECURE WIRELESS LOCAL OR METROPOLITAN AREA NETWORK AND RELATED METHODS

(75) Inventors: Thomas Jay Billhartz, Melbourne, FL (US); Frank Joseph Fleming, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 17 days.

(21) Appl. No.: 10/143,153

(22) Filed: May 10, 2002

(65) Prior Publication Data

US 2003/0210788 A1 Nov. 13, 2003

(51) Int. Cl.[7] .............................................. H04L 9/00
(52) U.S. Cl. ...................... 380/280; 380/262; 380/260; 380/43; 713/171; 713/168; 713/163
(58) Field of Search ................................ 380/280, 262, 380/284, 260, 274, 43, 46, 261; 713/171, 168, 163

(56) References Cited

U.S. PATENT DOCUMENTS

| | | | | |
|---|---|---|---|---|
| 5,239,584 A | | 8/1993 | Hershey et al. | 380/28 |
| 5,345,508 A | * | 9/1994 | Lynn et al. | 380/46 |
| 5,778,069 A | | 7/1998 | Thomlinson et al. | 380/25 |
| 5,832,228 A | | 11/1998 | Holden et al. | 395/200.55 |
| 5,872,847 A | | 2/1999 | Boyle et al. | 380/25 |
| 6,028,939 A | | 2/2000 | Yin | 380/49 |
| 6,167,514 A | * | 12/2000 | Matsui et al. | 713/150 |

(Continued)

OTHER PUBLICATIONS

Stubblefield et al., *Using the Fluhrer, Mantin and Shamir Attack to Break WEP*, AT&T Labs Technical Report, TD–4ZCPZZ, Revision 2, Aug. 21, 2001.

Borisov et al., *Intercepting Mobile Communications: The insecurity of 802.11*, In MOBICOM 2001, Rome, Italy, Jul. 2001.

Smith et al., *Securing Distance–Vector Routing Protocols*, ISOC Symposium on Network and Distributed System Security, San Diego, CA, 1997, pp. 85–92.

Nguyen et al., *Security Routing Analysis for Mobile Ad Hoc Networks*, Department of Interdisciplinary Telecommunications, University of Colorado at Boulder, Spring 2000.

RSA Security Response to Weaknesses in Key Scheduling Algorithm of RC4, RSA Laboratories, Sep. 1, 2001, available at, www.rsasecurity.com/rsalabs/technotes/wep.html.

Getgen, *Securing the Air: Don't Let Your Wireless LAN be a Moving Target*, IBM, Dec. 2001, available at www.–106.ibm.com/developerworks/library/wi–sec1/.

Mehta, *Wired Equivalency Privacy Vulnerability*, Apr. 4, 2001, available at www.rr.sans.org/wireless/equiv.php.

(Continued)

*Primary Examiner*—Gilberto Barron, Jr.
*Assistant Examiner*—A. Nobahar
(74) *Attorney, Agent, or Firm*—Allen, Dyer, Doppelt, Milbrath & Gilchrist, P.A.

(57) ABSTRACT

A secure wireless local or metropolitan area network and data communications device therefor are provided, where the device transmits plain text in an encrypted message including cipher text and an initialization vector. The device may include a seed generator for performing a one-way algorithm using a secret key, a device address, and a changing reference value for generating a seed. Further, a random initialization vector (IV) generator may be included for generating a random IV, and a key encryptor may generate a key sequence based upon the seed and the random IV. Additionally, a logic circuit may be included for generating cipher text based upon the key sequence and plain text, and a wireless communications device may be connected to the logic circuit and the random IV generator for wirelessly transmitting the encrypted message.

12 Claims, 5 Drawing Sheets

U.S. PATENT DOCUMENTS

| | | | |
|---|---|---|---|
| 6,215,876 B1 * | 4/2001 | Gilley | 380/260 |
| 6,263,437 B1 * | 7/2001 | Liao et al. | 713/169 |
| 6,438,666 B2 | 8/2002 | Cassagnol et al. | 711/163 |
| 6,542,608 B2 * | 4/2003 | Scheidt et al. | 380/44 |
| 2002/0035687 A1 * | 3/2002 | Skantze | 713/168 |
| 2003/0059052 A1 * | 3/2003 | Cheng | 380/274 |

OTHER PUBLICATIONS

Ross, *Containing the Wireless LAN Security Risk*, Nov. 4, 2000, available at www.rr.sans.org/wireless/wireless_LAN.php.

*WEP Fix Using RC4 Fast Packet Keying*, RSA Laboratories, Dec. 17, 2001, available at www.rsasecurity.com/rsalabs/technotes/wep–fix.html.

Phifer, Fixed Wireless Technology—Better Than WEP, ISP Planet, Feb. 1, 2002, available at www.isp–planet.com/fixed_wir...technology/2002/better_than_wep.html.

Ying, *KeyHopping™—A Security Enhancement Scheme for IEE 802.11 WEP Standards*, NextComm, Inc., 2002.

* cited by examiner

SECURE WIRELESS LOCAL OR METROPOLITAN AREA NETWORK AND RELATED METHODS

FIELD OF THE INVENTION

The present invention relates to the field of wireless networks, and, more particularly, to wireless local and metropolitan area networks and related methods.

BACKGROUND OF THE INVENTION

Wireless networks have experienced increasing development over the past several years. Two particular examples are the wireless local area network (LAN), and the wireless metropolitan area network (MAN), both of which typically include several wireless stations (e.g., a laptop with a wireless Ethernet-type card) which communicate with one or more access points (e.g., a server) via radio frequency signals, for example. The fixed nodes may be used to provide a bridge between the wireless LAN/MAN and a wired network, such a telephone network, for example, as well as facilitate communications between wireless nodes. Of course, in some wireless LANs/MANs the wireless stations may, to a limited extent, also engage in direct peer-to-peer communications with one another.

One of the more prominent standards which has been developed for regulating communications within wireless LANs/MANs is that of the Institute of Electrical and Electronic Engineers' 802 LAN/MAN Standards Committee, entitled "IEEE Standards for Information Technology—Telecommunications and Information Systems—Local and Metropolitan Area Network—Specific Requirements—Part 11: Wireless LAN Medium Access Control (MAC) and Physical Layer (PHY) Specifications," 1999, which is hereby incorporated herein in its entirety by reference. In addition to providing wireless communications protocols, the 802.11 standard also defines a wired equivalent privacy (WEP) algorithm which is used to protect wireless signals from eavesdropping, as wireless signals are typically more vulnerable to being intercepted than signals sent on wired networks. WEP relies on a secret key that is shared between wireless stations and an access point. The secret key is used to encrypt data packets prior to transmission, and an integrity check is used to ensure that packages are not modified during the transmission.

Nonetheless, it has recently been discovered that the WEP algorithm is not as immune to external attacks as once believed. For example, in an article entitled "Intercepting mobile communications: The Insecurity of 802.11" by Borisov et al., MOBICOM, Rome, Italy, July 2001, the authors set forth a number of vulnerabilities in WEP. In particular, it was noted that a significant breach of security occurs when two messages are encrypted using a same initialization vector (IV) and secret key, as this can reveal information about both messages. More particularly, in accordance with WEP message ciphertext is generated using an exclusive OR operation. By exclusive ORing ciphertext from two messages generated using the same IV, the key streams cancel out and it is then possible to recover the plain text. As such, this key stream re-use is susceptible to a decryption dictionary attack in which a number of messages are stored and compared to find multiple messages generated with a same IV.

Moreover, in a presentation by Fluhrer et al. entitled "Weaknesses in the Key Scheduling Algorithm of RC4" delivered in August of 2001 at the Eighth Annual Workshop on Selected Areas in Cryptography, several weaknesses in the key scheduling algorithm of WEP were outlined along with a proposed method for exploiting these weaknesses, which is commonly known as the "Fluhrer attack." Others have subsequently implemented the Fluhrer attack and established its viability. See, e.g., Stubblefield et al., "Using the Fluhrer, Mantin, and Shamir Attack to Break WEP," AT&T Labs Technical Report TD-4ZCPZZ, Aug. 6, 2001.

As a result of such newly discovered weaknesses in WEP, several attempts have been made to make WEP less susceptible to external attacks. One such approach developed by RSA Security Inc. is called "Fast Packet Keying." This approach uses a hashing function that generates a unique pseudo-random key for each packet of data sent over the wireless LAN. The hash function is implemented in two phases. Phase one involves key mixing where the transmitter address (TA) is mixed into a secret temporal key (TK) to ensure that the various parties encrypting with the TK use different key streams.

By mixing the TA and the TK, a different set of keys is used by each party. Traffic sent by a wireless station to the access point uses a different set of keys than traffic sent by the access point to the wireless station. This output is typically cached to improve performance and can be reused to process future packets with the same TK and TA. Phase two mixes the output of the first phase with an IV and generates a unique per-packet key for each data packet. To avoid any repetition of keys, a different IV is used for each packet encrypted under the TK.

Another approach called "Key Hopping" has been developed by NextComm, Inc. This approach requires that security keys be switched on a frequent basis to make it more difficult for intruders to adapt to the air traffic to learn and break the encryption. The existing key set mechanism used in WEP is therefore modified to generate "session keys" using the previously defined secret WEP key, a basic service set identifier (BSSID), and a random seed. Further details regarding this approach may be found in a white paper by Ying entitled "Key Hopping—A Security Enhancement Scheme for IEEE 802.11 WEP Standards," February 2002, available at http://www.nextcomm.com.

One potential drawback of the above approaches is that it may be cumbersome to continuously generate and/or distribute temporary or session keys to different nodes in the network. Further, the temporary key distribution mechanism for Fast Packet Keying as yet remains unspecified. Generation of session keys in Fast Packet Keying also requires infrastructure such as an Access Point, and is less suitable for ad-hoc WLANs.

SUMMARY OF THE INVENTION

In view of the foregoing background, it is therefore an object of the present invention to provide devices and methods for wireless LANs/MANs having enhanced security features.

This and other objects, features, and advantages in accordance with the present invention are provided by a secure wireless data communications device for transmitting plain text in an encrypted message including cipher text and an initialization vector. The device may include a seed generator for performing a one-way algorithm using a secret key, a device address, and a changing reference value. Further, a random initialization vector (IV) generator may be included for generating a random IV, and a key encryptor may generate a key sequence based upon the seed and the random IV. Additionally, a logic circuit may be included for generating cipher text based upon the key sequence and plain text, and a wireless communications device may be connected to the logic circuit and the random IV generator for wirelessly transmitting the encrypted message, which includes the cipher text and random IV.

More particularly, the one-way algorithm may be a hashing algorithm, such as a single-phase hashing algorithm, for example. Also, the wireless communications device may have associated therewith a media access controller (MAC) layer, and the changing reference value may be a MAC layer sequence number. By way of example, the changing reference value may have a size greater than or equal to about 12 bits. The use of the hashing algorithm makes the secret key much less susceptible to attacks such as the Fluhrer attack. Moreover, use of the sequence number makes attacks such as a decryption dictionary attack much less likely as it greatly increases the size of the dictionary required for such an attack.

Furthermore, an integrity checker may be included for generating an integrity check value based upon the plain text. The logic circuit may generate the cipher text based upon the key sequence, the plain text, and the integrity check value. Moreover, the device may also include a concatenator for concatenating the plain text and the integrity check value, and the logic circuit may generate the cipher text based upon the key sequence and the concatenation of the plain text and the integrity check value. By way of example, the integrity checker may include a checksum generator.

The device may also include a concatenator for concatenating the seed and the random IV, and the key encryptor may generate the key sequence based upon the concatenation of the seed and the random IV. The random IV may advantageously have a size of greater than about 24 bits, which may provide yet further protection against a decryption dictionary attack, for example. The logic circuit may be an exclusive OR logic circuit. Also, the secret key may be a static secret key, and the key encryptor may include a pseudo-random number generator.

In accordance with another aspect of the invention, the secure wireless data communications device may include a random IV generator for generating a random IV, and a seed generator for performing a single-phase, one-way algorithm using a secret key, a device address, and the random IV for generating a seed. Moreover, the device may include a key encryptor for generating a key sequence based upon the seed, a logic circuit for generating the cipher text based upon the key sequence and the plain text, and a wireless communications device connected to the logic circuit and the random IV generator for wirelessly transmitting the encrypted message.

A secure wireless data communications method aspect of the invention is for a wireless local area network (LAN) or wireless metropolitan area network (MAN) which includes a plurality of terminals. The method may include performing a one-way algorithm at a transmitting terminal using a secret key, a device address, and a changing reference value to generate a seed. Further, a random IV may be generated at the transmitting terminal, and a key sequence may also be generated at the transmitting terminal based upon the seed and the random IV. The method may also include encrypting plain text at the transmitting terminal using the key sequence to generate cipher text, and transmitting the cipher text and random IV from the transmitting terminal to a receiving terminal over the wireless communications link.

Another related method aspect of the invention may include generating a random IV at the transmitting terminal, and performing a single-phase algorithm at the transmitting terminal using a secret key, a device address, and the random IV to generate a seed. Further, the method may also include generating a key sequence at the transmitting terminal based upon the seed, encrypting plain text at the transmitting terminal using the key sequence to generate cipher text, and transmitting the cipher text and random IV from the transmitting terminal to the receiving terminal over a wireless communications link.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
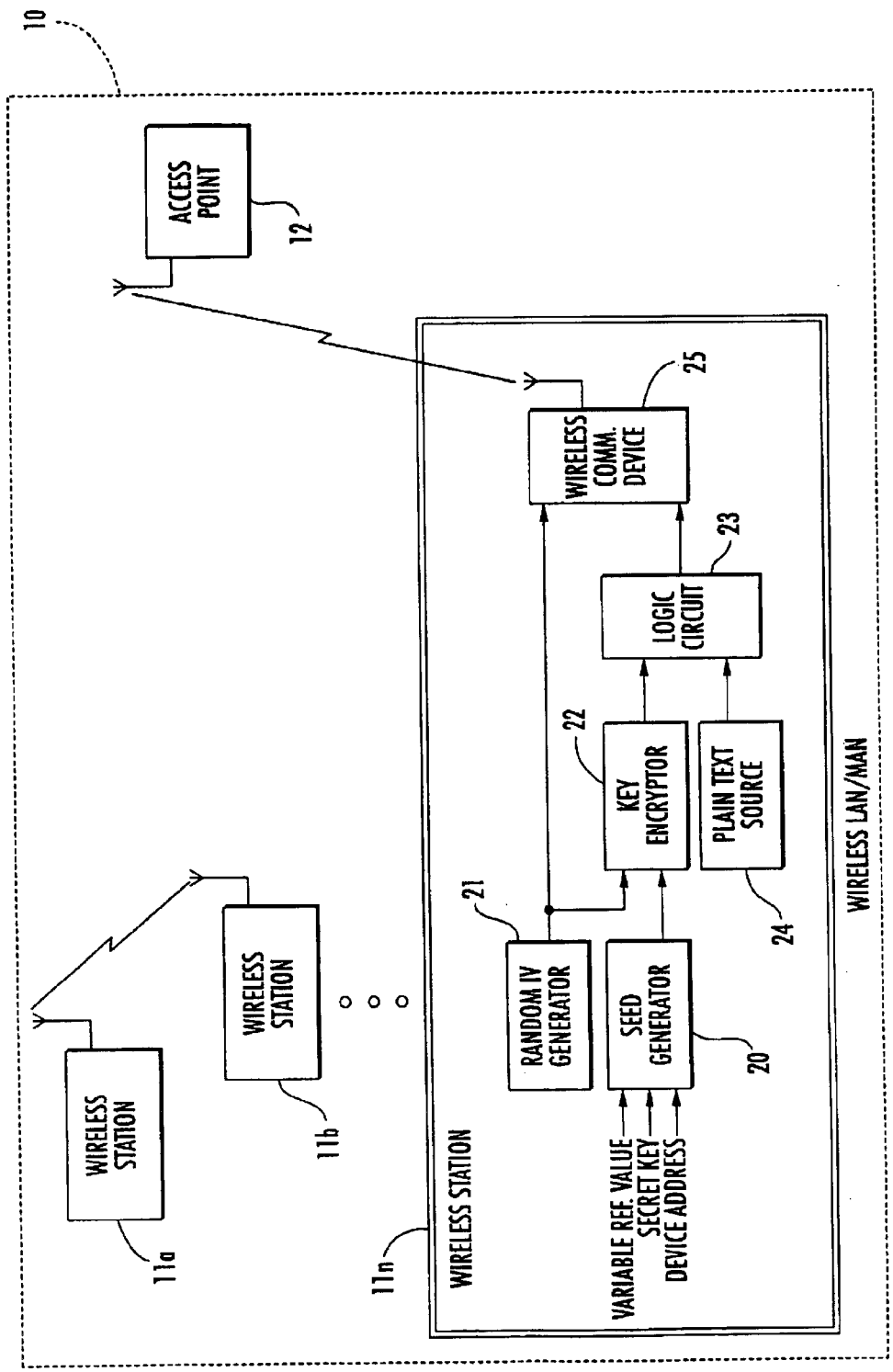
FIG. 1 is a schematic block diagram of a wireless LAN/MAN including a secure wireless communications device in accordance with the present invention.

Referring initially to FIG. 1, a wireless LAN or MAN 10 illustratively includes a plurality of terminals, namely wireless stations 11a–11n and an access point 12. The wireless stations 11 may be a laptop computer, personal data assistant (PDA), or other suitable device. Moreover, the access point 12 may be a device such as a server, for example, which provides a bridge between the wireless stations 11a–11n and a fixed or wired communications network (not shown). Of course, the wireless stations 11 and access point 12 are preferably capable of bi-directional communication, and any number of wireless stations and access points may be used in accordance with the invention.

More particularly, the wireless station 11n is illustratively implemented as (or includes) a secure wireless data communications device for transmitting plain text in an encrypted message to the access point 12 and/or to another wireless station(s) when in an ad-hoc mode, as will be understood by those of skill in the art. In accordance with the above noted 802.11 standard, for example, when the WEP security function is enabled the encrypted messages include cipher text and an initialization vector (IV). The IV is normally used in WEP to augment the shared secret key used by the terminals and produce a different key sequence for each packet of text, thus avoiding two cipher texts having the same key stream.

As noted above, even the use of the IV as called for in the 802.11 standard makes WEP vulnerable to attacks such as the Fluhrer attack. In contrast to the 802.11 standard, in which the secret key is concatenated with the IV to generate a key seed, the wireless station 11n advantageously includes a seed generator 20 for performing a one-way algorithm using the secret key, a device address, and a changing reference value for generating the seed. It should be noted that while the present invention is described herein for use with the 802.11 standard, the present invention may also be implemented with other wireless LAN protocols, such as Bluetooth, as will be appreciated by those of skill in the art.

By way of example, the one-way algorithm may be a hashing algorithm, for example, such as the MD5 or SHA-1 hashing algorithms, which is known to those of skill in the art. Of course, other suitable one-way algorithms known to those skilled in the art may also be used. Such algorithms are designed to make it extremely difficult to determine what is upstream from the hashing function (i.e., the components processed by the algorithm). Stated alternately, the use of such algorithms make it extremely unlikely that other components can be used to produce the same value output from the algorithm without access to the original input, including the secret key.

As will be appreciated by those of skill in the art, the secret key called for in the WEP standard is typically 40 bits, and it may be distributed to the wireless stations 11a–11n and access point 12 by various methods, such as by a network administrator, for example. The device address may similarly be assigned by a network administrator, for example, in accordance with the particular software and/or protocols being implemented for the wireless LAN/MAN 10. While the node address need not be used in every embodiment, by its inclusion a third party who wishes to compare encrypted network messages to learn the secret key must necessarily compare messages only from one terminal. Thus, the added difficulty of collecting a sufficiently large number of encrypted messages from a single terminal may serve as a further deterrent to many would be hackers.

The 802.11 standard is for use with wireless communications devices which have associated therewith a plurality of application control layers, one of which is the media access controller (MAC) layer. The MAC layer typically has a sequence number associated therewith which is updated with each encrypted message that is sent. In accordance with the invention, the changing reference value may conveniently be the MAC layer sequence number, although other changing reference values may be generated or used for creating the key seed. By way of example, the changing reference value may have a size greater than or equal to about 12 bits, which is the typical size of the MAC layer sequence number. By using a 12-bit changing reference value, for example, a decryption dictionary attack would have to be 4096 times as large as with the standard WEP protocol to be successful, making such an attack essentially unfeasible.

The wireless station 11n also illustratively includes a random IV generator for generating a random IV, and a key encryptor 22 is used to generate a key sequence based upon the seed and the random IV. Of course, those of skill in the art will appreciate that other types of IV generators may also be used in some embodiments, such as counters, or value-flipping (i.e., switching between two or more IV values) devices, for example. However, random IV generation will require that a maximum size dictionary be used to perform a successful decryption dictionary attack, and may therefore be preferable in many embodiments.

The key encryptor 22 preferably implements the RC4 pseudo-random number generation algorithm specified in the 802.11 standard, although here again other suitable random number or key sequence generating algorithms may be used in some embodiments. In the case of RC4, the first 256 bytes (or other numbers of bytes) of the RC4 keystream could be discarded as further security against Fluhrer attacks, for example, as will be appreciated by those of skill in the art.

The wireless station 11n further illustratively includes a logic circuit 23 for generating cipher text based upon the key sequence and plain text from a plain text source 24. The plain text source may generate plain text at the wireless station 11n, for example, or it may simply be an input for receiving text from another terminal to be passed along. In accordance with the 802.11 standard, the logic circuit 23 is typically an exclusive OR logic circuit (FIG. 2), but other suitable logic circuits known to those of skill in the art may also be used. A wireless communications device 25 is connected to the logic circuit 23 and the random IV generator 21 for wirelessly transmitting the encrypted message which includes the cipher text and random IV, as illustratively shown. The wireless communications device may be any suitable wireless transceiver device which operates according to the 802.11 or other wireless LAN protocol (e.g., Bluetooth), for example.

Figure 2:
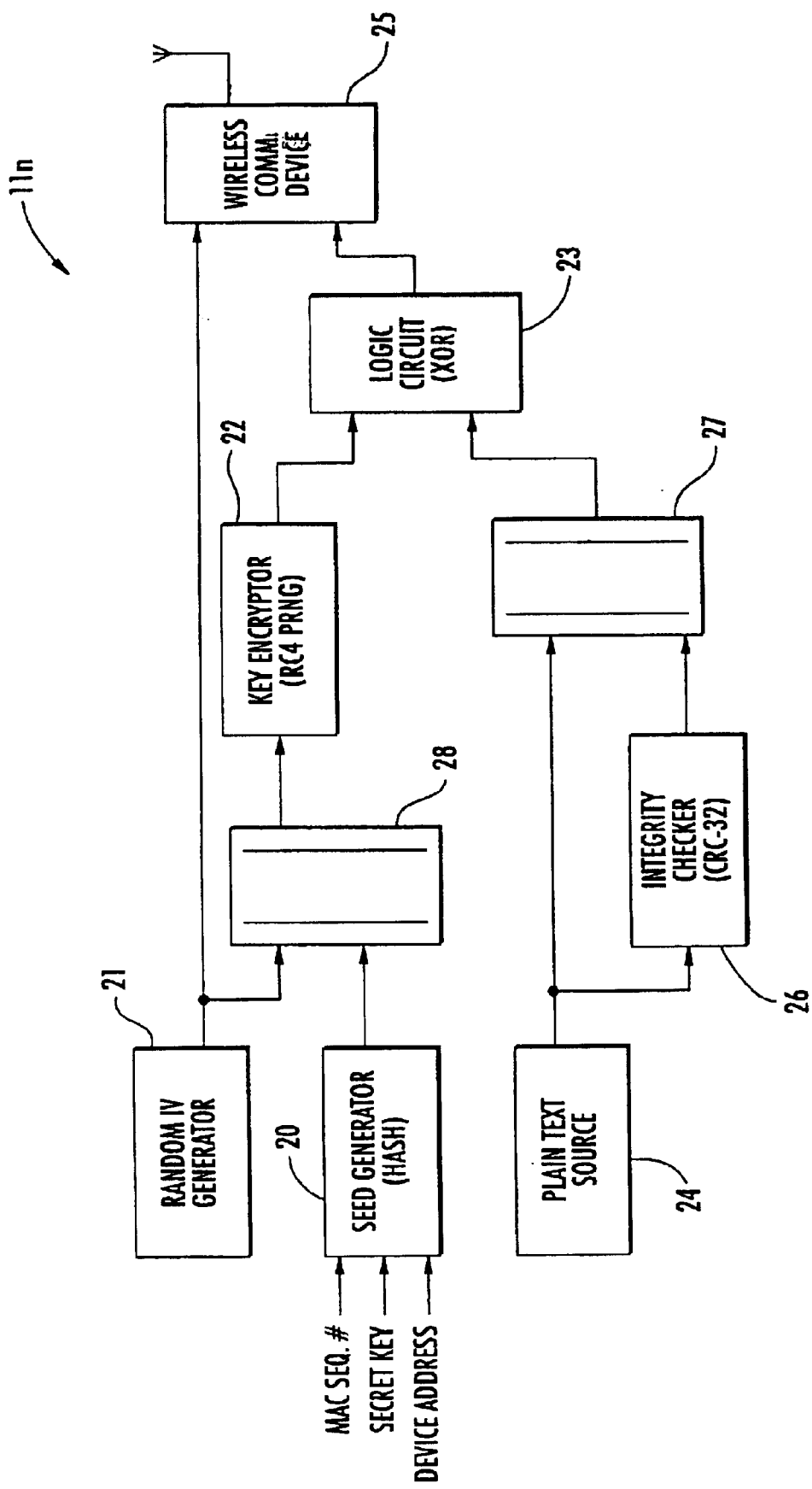
FIG. 2 is a more detailed schematic diagram of the secure wireless communications device of FIG. 1.

Turning now additionally to FIG. 2, the wireless station 11n is shown in further detail. As illustrated, the wireless station 11n also includes an integrity checker 26 for generating an integrity check value or field based upon the plain text to be placed in the cipher text. By way of example, the integrity check field may be implemented as a CRC-32 checksum value in accordance with the 802.11 standard, though other suitable integrity check values known to those of skill in the art may also be used. Moreover, the wireless station 11n further includes a concatenator 27 for concatenating the plain text and the integrity check value, and the logic circuit 23 may generate the cipher text based upon the key sequence and the concatenation of the plain text and the integrity check value.

Similarly, a concatenator 28 is also included for concatenating the seed and the random IV, and the key encryptor 22 thus generates the key sequence based upon the concatenation of the seed and the random IV. In accordance with the 802.11 standard, the IV has a size of 24 bits. Yet, in accordance with the present invention, the random IV preferably has a size of greater than about 24 bits (e.g., 48 bits), which may provide yet further protection against a decryption dictionary attack, for example. Of course, even larger sizes of IVs may also be used, if desired, to reduce the possibility of even a single collision of IV's when IV's are generated randomly, as will be appreciated by those of skill in the art.

One particular advantage of the above approach is that it does not require the continuous generation and/or distribution of temporary or session keys to different nodes in the wireless LAN/MAN 10, as is the case with the Fast Packet Keying and Key Hopping approaches described above. Rather, the secret key may be a "static" secret key that need not be frequently changed to ensure enhanced security. Of course, the secret key may be periodically (e.g., daily, monthly, etc.) changed in some embodiments, if even further security enhancements are desired, as will be appreciated by those of skill in the art.

Figure 3:
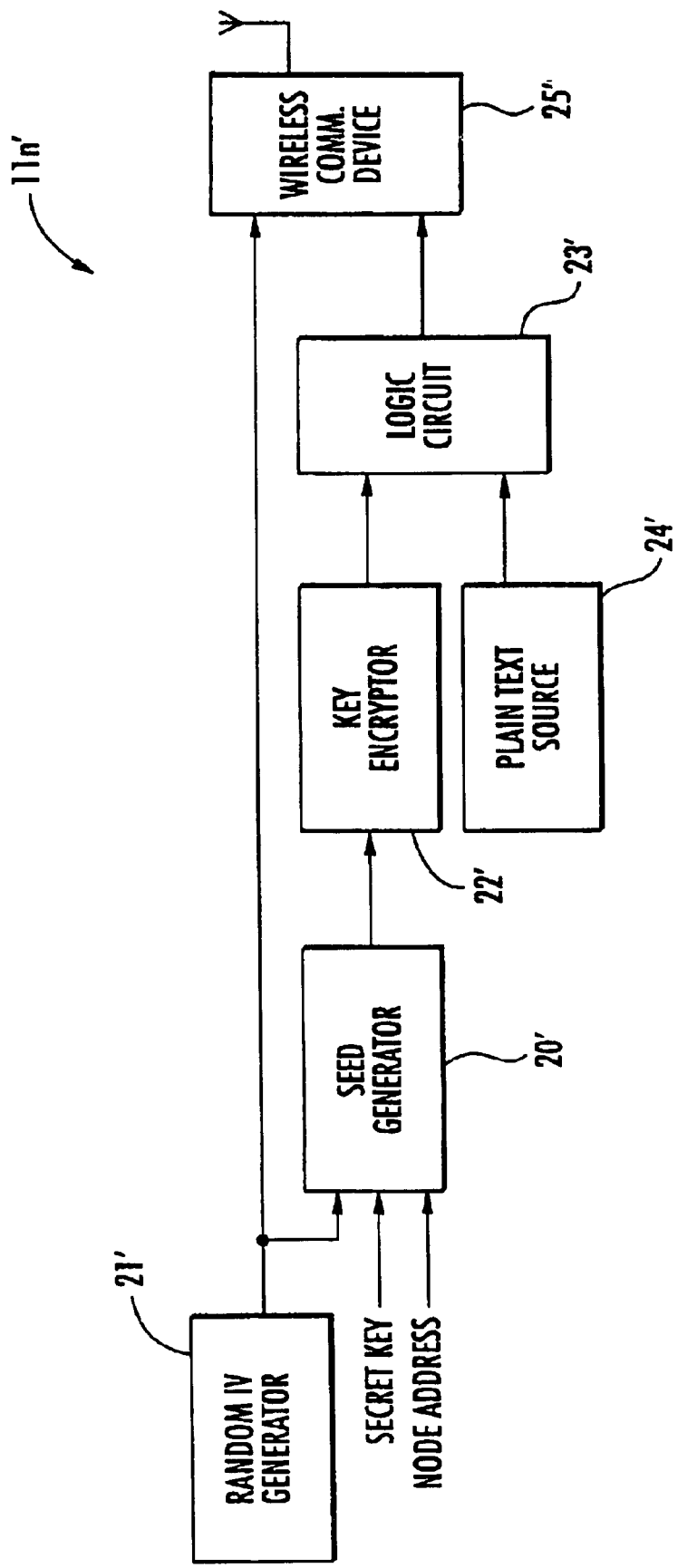
FIG. 3 is a schematic block diagram of an alternate embodiment of the secure wireless communications device of FIG. 1.
Figure 4:
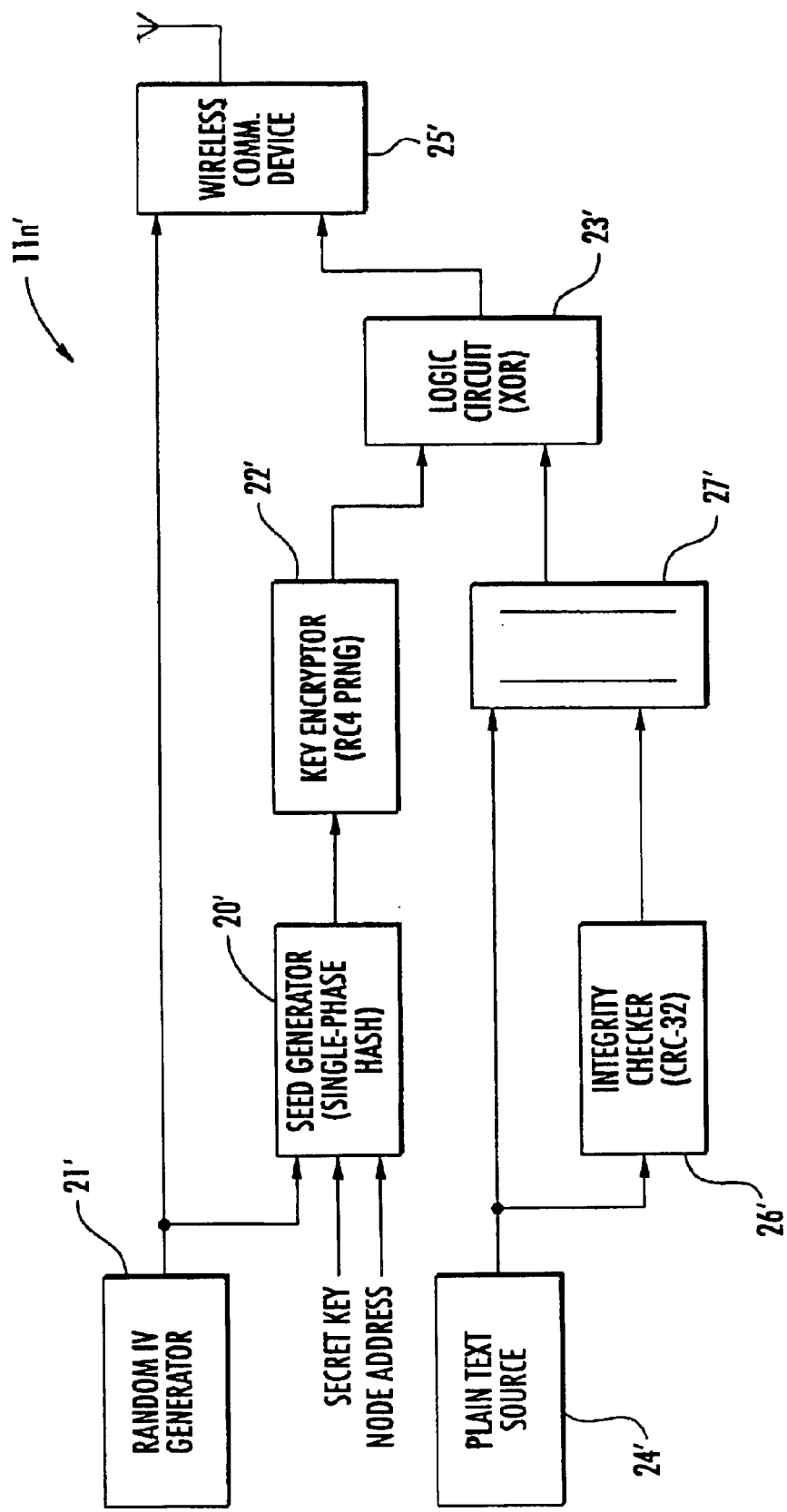
FIG. 4 is a more detailed schematic block diagram of the secure wireless communications device of FIG. 3.

An alternate embodiment of the wireless station 11n is illustrated in FIGS. 3 and 4. In this embodiment, the seed generator 20' performs a single-phase, one-way algorithm (e.g., a hashing algorithm) using the secret key, the device address, and the random IV (as opposed to the changing reference value, as described above) to generate the seed. By using an extended IV (e.g., 48 bits) as noted above, the use of a decryption dictionary attack to discover the secret key would be extremely impractical, as will be appreciated by those of skill in the art. The remaining elements not specifically discussed in FIGS. 3 and 4 are similar to those noted above and will therefore not be discussed further herein.

Figure 5:
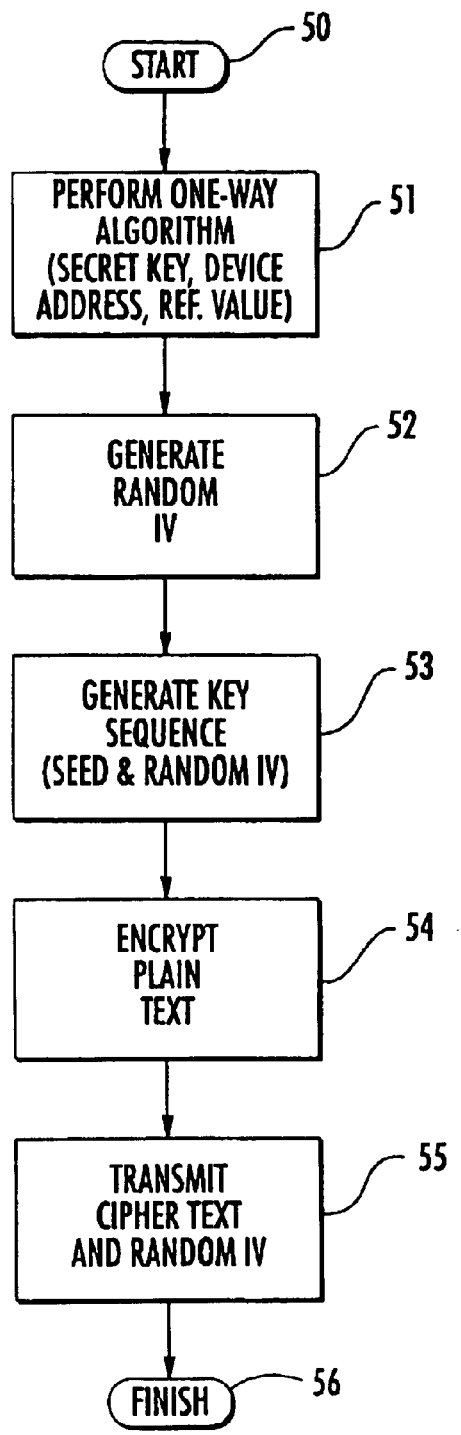
FIG. 5 is a flow diagram illustrating a secure wireless data communications method in accordance with the invention.

A secure wireless data communications method aspect of the invention is illustrated in FIG. 5. The method begins (Block 50) by performing a one-way algorithm at a transmitting terminal using a secret key, a device address, and a changing reference value to generate a seed, at Block 51. In the example illustrated in FIG. 1, the transmitting terminal is the wireless station 11n. Of course, those of skill in the art will appreciate that any of the other wireless stations 11 and the access point 12 may also be transmitting terminals in accordance with the invention.

Further, a random IV may be generated at the transmitting terminal, at Block 52, and a key sequence may also be generated at the transmitting terminal based upon the seed and the random IV, at Block 53. The method may also include encrypting plain text at the transmitting terminal using the key sequence to generate cipher text (Block 54), as described above, and transmitting the cipher text and random IV from the transmitting terminal to a receiving terminal (the access point 12 in the illustrated example) over the wireless communications link, at Block 55, thus concluding the method (Block 56). Again, any one of the wireless stations 11a–11n or the access point 12 may serve as a receiving terminal.

Figure 6:
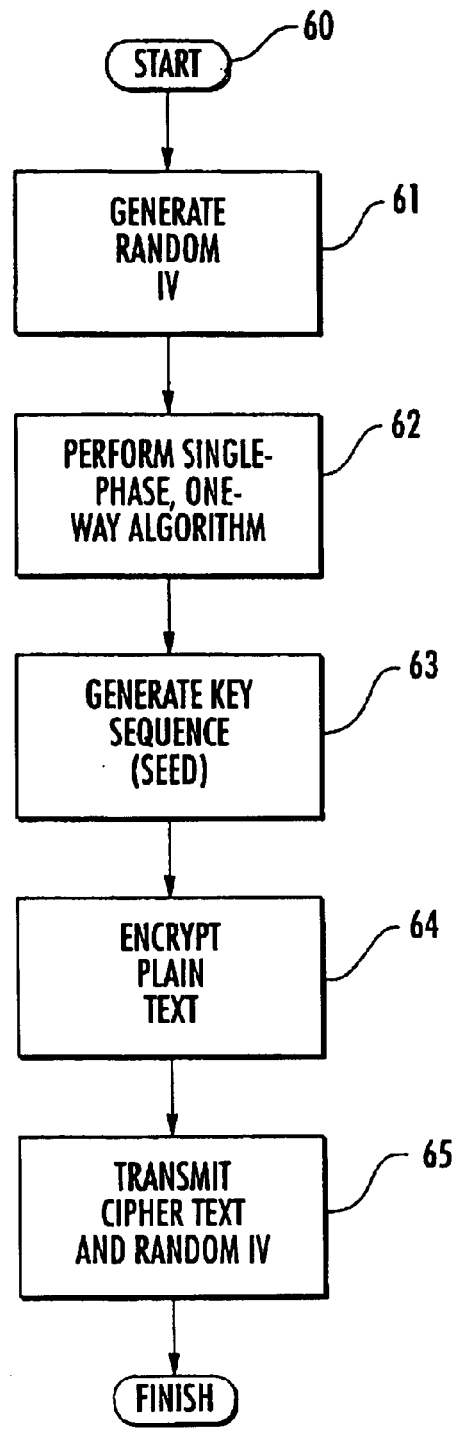
FIG. 6 is a flow diagram illustrating an alternate secure wireless data communications method in accordance with the invention.

Another related method aspect of the invention is illustrated in the flow diagram of FIG. 6. The method begins (Block 60) with generating the random IV at the transmitting terminal, at Block 61, and performing a single-phase algorithm at the transmitting terminal using the secret key, the device address, and the random IV to generate a seed, at Block 62. Again, the single-phase algorithm is preferably a single-phase hashing algorithm, but other suitable one-way algorithms may also be used.

Further, the method may also include generating a key sequence at the transmitting terminal based upon the seed, at Block 63, encrypting plain text at the transmitting terminal using the key sequence to generate cipher text, at Block 64, and transmitting the cipher text and random IV from the transmitting terminal to the receiving terminal over a wireless communications link (Block 65), thus concluding the method. Further aspects of the above methods will be apparent to those of skill in the art from the above description and will therefore not be discussed further herein.

Additional features of the invention may be found in the co-pending application entitled SECURE MOBILE AD-HOC NETWORK AND RELATED METHODS, attorney docket no. GCSD-1316 (51282), the entire disclosure of which is hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A secure wireless data communications device for transmitting plain text in an encrypted message comprising cipher text and an initialization vector, the device comprising:
   a seed generator for performing a one-way algorithm using a secret key, a device address, and a changing reference value for generating a seed;
   a random initialization vector (IV) generator for generating a random IV;
   a key encryptor for generating a key sequence based upon the seed and the random IV;
   an integrity checker for generating an integrity check value based upon the plain test;
   a logic circuit generating cipher text based upon the key sequence, plain text, and integrity check value; and
   a wireless communications device connected to said logic circuit and said random IV generator for wirelessly transmitting the encrypted message comprising the cipher text and random IV.

2. The device of claim 1 further comprising a concatenator for concatenating the plain text and the integrity check value; and wherein said logic circuit generates the cipher text based upon the key sequence and the concatenation of the plain text and the integrity check value.

3. A secure wireless data communications device for transmitting plain text in an encrypted message comprising cipher text and an initialization vector, the device comprising:
   a random initialization vector (IV) generator for generating a random IV;
   a seed generator for performing a single-phase, one-way algorithm using a secret key, a device address, and the random IV for generating a seed;
   a key encryptor for generating a key sequence based upon the seed;
   an integrity checker for generating an integrity check value based upon the plain text;
   a logic circuit for generating the cipher text based upon the key sequence, plain text, and integrity cheek value; and
   a wireless communications device connected to said logic circuit and said random IV generator for wirelesely transmitting the encrypted message comprising the cipher text and random IV.

4. The device of claim 3 further comprising a concatenator for concatenating the plain text and the integrity check value; and wherein said logic circuit generates the cipher text based upon the key sequence and the concatenation of the plain text and the integrity check value.

5. A wireless local or metropolitan area network comprising:
   a plurality of terminals comprising a transmitting terminal and at least one receiving terminal, said transmitting terminal comprising:
      a seed generator for performing a one-way algorithm using a secret key, a device address, and a changing reference value for generating a seed,
      a random initialization vector (IV) generator for generating a random IV,
      a key encryptor for generating a key sequence based upon the seed and the random IV,
      an integrity checker for generating an integrity check value based upon the plain text;
      a logic circuit generating cipher text based upon the key sequence, plain text, and integrity check value, and a wireless communications device connected to said logic circuit and said random IV generator for wirelessly transmitting an encrypted message comprising the cipher text and random IV to said at least one receiving terminal.

6. The wireless network of claim 5 wherein said transmitting terminal further comprises a concatenator for concatenating the plain text and the integrity check value; and wherein said logic circuit generates the cipher text based upon the key sequence and the concatenation of the plain text and tho integrity check value.

7. A wireless local or metropolitan area network comprising:
 a plurality of terminals comprising a transmitting terminal and at least one receiving terminal, said transmitting terminal comprising
  a random initialization vector (IV) generator for generating a random IV,
  a seed generator for performing a single-phase, one-way algorithm using a secret key, a device address, and the random IV for generating a seed,
  a key encryptor for generating a key sequence based upon the seed,
  an integrity checker for generating an integrity check value based upon the plain text;
  a logic circuit for generating the cipher text based upon the key sequence, the plain text, and the integrity check value, and
  a wireless communications device connected to said logic circuit and said random IV generator for wrecklessly transmitting an encrypted message comprising the cipher text and random IV to said at least one receiving terminal.

8. The wireless network of claim 7 wherein said transmitting terminal further comprises a concatenator for concatenating the plain text and the integrity check value; and wherein said logic circuit generates the cipher text based upon the key sequence and the concatenation of the plain text and the integrity check value.

9. A secure wireless data communications method for a wireless local or metropolitan area network comprising a plurality of terminals, the method comprising:
 performing a one-way algorithm at a transmitting terminal using a secret key, a device address, and a changing reference value to generate a seed;
 generating a random initialization vector (IV) at the transmitting terminal;
 generating a key sequence at the transmitting terminal based upon the seed and the random IV;
 generating an integrity check value at transmitting terminal based upon plain text;
 encrypting the plain text and the integrity check value at the transmitting terminal using the key sequence to generate cipher text; and
 transmitting the cipher text and random IV from the transmitting terminal to a receiving terminal over the wireless communications link.

10. The method of claim 9 further comprising concatenating the plain text and the integrity check value; and wherein encrypting comprises encrypting the concatenation of the plain text and the integrity check value.

11. A secure wireless data communications method for a wireless local or metropolitan area network comprising a plurality of terminals, the method comprising:
 generating a random initialization vector (IV) at the transmitting terminal;
 performing a single-phase algorithm at the transmitting terminal using a secret key, a device address, and the random IV to generate a seed;
 generating a key sequence at the transmitting terminal based upon the seed;
 generating en integrity check value at transmitting terminal based upon plain text;
 encrypting the plain text and the integrity check value at the transmitting terminal using the key sequence to generate cipher text; and
 transmitting the cipher text and random IV from the transmitting terminal to the receiving terminal over a wireless communications link.

12. The method of claim 11 further comprising concatenating the plain text and the integrity check value; and wherein encrypting comprises encrypting the concatenation of the plain text and the integrity check value.

* * * * *

UNITED STATES PATENT AND TRADEMARK OFFICE
CERTIFICATE OF CORRECTION

PATENT NO. : 6,931,132 B2
DATED : August 16, 2005
INVENTOR(S) : Billhartz et al.

It is certified that error appears in the above-identified patent and that said Letters Patent is hereby corrected as shown below:

Column 1,
Line 21, delete "such a" insert -- such as a --.

Column 6,
Line 66, delete "11n" insert -- 11n' --.

Column 8,
Line 14, delete "test" insert -- text --.
Line 41, delete "cheek" insert -- check --.
Line 44, delete "wirelessely" insert -- wirelessly --.

Column 9,
Line 11, delete "tho" insert -- the --.
Line 31, delete "wrecklessly" insert -- wirelessly --.

Column 10,
Line 31, delete "en" insert -- an --.

Signed and Sealed this

Thirteenth Day of December, 2005

JON W. DUDAS
*Director of the United States Patent and Trademark Office*